Aug. 28, 1956  J. D. WALLACE  2,761,118
MAGNETOSTRICTIVE TRANSDUCER
Filed Feb. 14, 1952
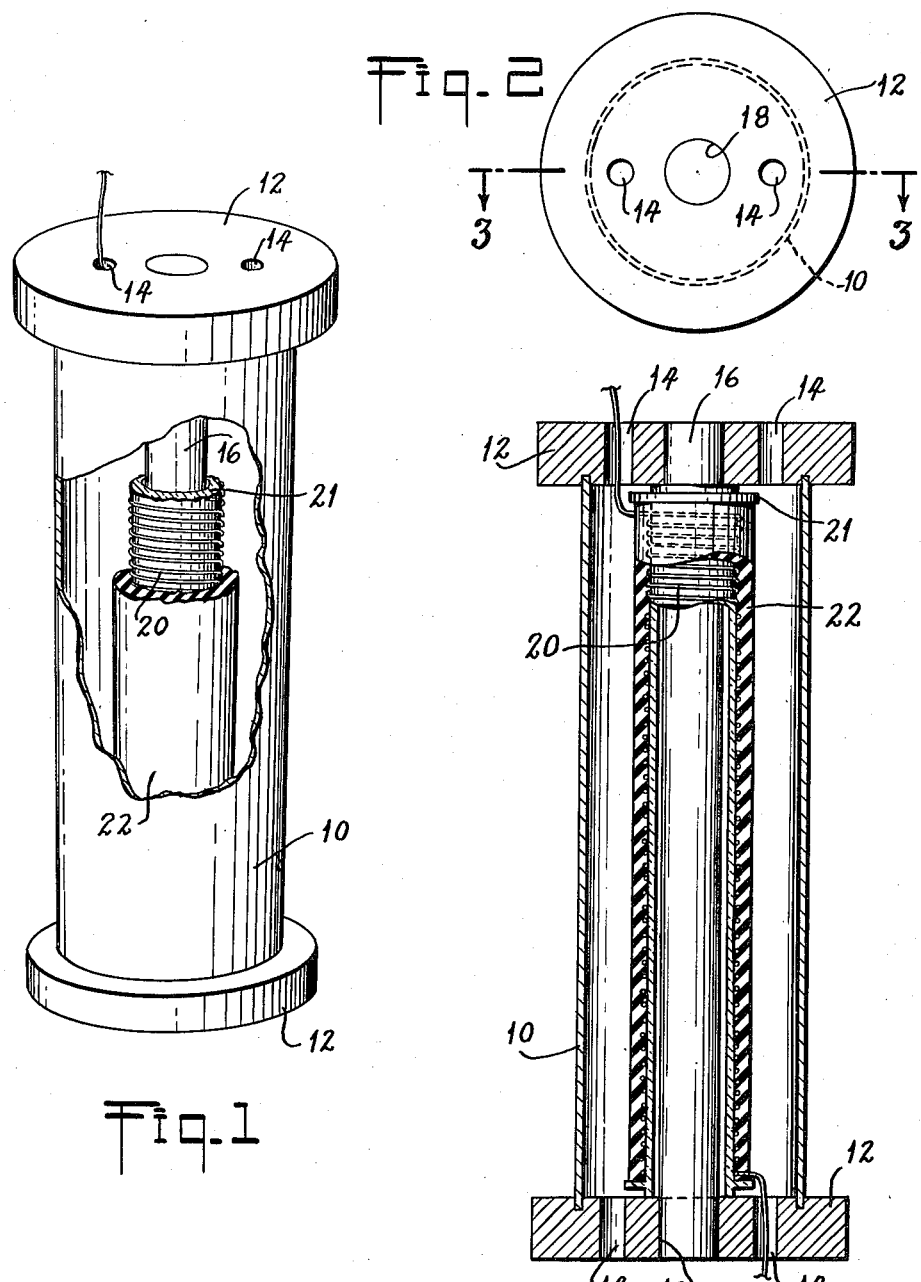
INVENTOR.
JOHN D. WALLACE
BY
D. C. Snyder
Roderick B. Town
ATTORNEYS

United States Patent Office 2,761,118
Patented Aug. 28, 1956

2,761,118
MAGNETOSTRICTIVE TRANSDUCER
John D. Wallace, Oreland, Pa.

Application February 14, 1952, Serial No. 271,623

3 Claims. (Cl. 340—11)

(Granted under Title 35, U. S. Code (1952), sec. 266)

The invention described herein may be manufactured and used by or for the Government of the United States of America for governmental purposes without the payment of any royalties thereon or therefor.

The present invention relates to a magnetostrictive transducer, or hydrophone, which is particularly suited for use in underwater signaling systems where compactness and simplicity of construction are of paramount importance.

Many devices are known for translating mechanical energy in the form of pressure waves into corresponding electrical variations. Some of these mechanisms employ the piezoelectric principle, others embody a dynamic moving-coil unit, and still others are constructed with diaphragm-driven tubes or plates. Each of these arrangements possesses certain disadvantages—the crystal form is non-resonant; the moving-coil unit is quite delicate; and the large size of the diaphragm-type device frequently precludes its usage. The need has accordingly been recognized for a transducer which is small compared with the wavelength of the sound to be detected, and which is not only efficient in operation but at the same time capable of withstanding rough handling. Those forms incorporating a magnetostrictive element appear to offer the best possibilities for a solution to the problem.

One step toward a practical device was taken when it was discovered by applicant that the magnetostrictive element of such a combination may be designed to provide its own polarization. This permits a more compact arrangement and also eliminates the necessity of using separate magnetizing members for this purpose. Then it was found that instead of coupling a pick-up coil to the magnetostrictive element itself, the coil could more advantageously be associated with a core of high-permeability material forming part of a closed path for the magnetic flux surrounding the magnetostrictive tube. By such a design, the output current induced in the pick-up coil can be made more accurately representative of changes in flux density and hence of the magnitude of the oscillations of the magnetostrictive member than has heretofore been the case with so-called "direct-coupled" arrangements.

In constructing one form of compact transducer assembly incorporating the above principles, a hollow tubular element composed of magnetostrictive material is securely attached to a pair of high-permeability end-caps. A rod-like core, also of high-permeability material, lies co-axially within the magnetostrictive tube and is rigidly secured to each end-cap. This core serves as a support for a pick-up coil, which may, if desired, be encased by a water-tight jacket of rubber, plastic or other non-magnetic material serving to protect the coil from damage when the interior of the hydrophone is flooded.

It will now be recognized that any compressional wave energy of supersonic frequency which is received by the hydrophone will cause the magnetostrictive element thereof to vibrate, the magnitude of these vibrations being dependent upon the relationship between the received sound waves and the frequency-response characteristic of the transducer. The resulting flux variation within the magnetostrictive tube is transmitted to one end-cap, through the rod-like core to the other end-cap, and back to the tube. This flux variation through the core is picked up by the surrounding coil. Since the magnetostrictive member is polarized longitudinally, such a design provides optimum energy transfer for those vibrations of the tube which coincide with its direction of polarization.

One object of the present invention, therefore, is to provide an improved form of magnetostrictive transducer particularly suited for underwater signalling.

Another object of the present invention is to provide a transducer in which the magnetostrictive element thereof is arranged to be self-polarized.

A still further object of the present invention is to provide a magnetostrictive transducer, or hydrophone, in which a closed path of high permeability is provided for magnetic flux variations, such that energy losses are reduced to a minimum and optimum operating efficiency obtained.

Other objects and advantages will be apparent from the following description of a preferred form of the invention and from the drawings, in which:

Fig. 1 is a perspective view of one form of hydrophone constructed in accordance with the present invention, a portion of the magnetostrictive tube being broken away to show the arrangement of the inner core and pick-up coil;

Fig. 2 is an end view of the hydrophone of Fig. 1; and

Fig. 3 is a cross-sectional view of Fig. 2 taken along the line 3—3, showing particularly the manner in which the end-caps are secured both to the magnetostrictive tube and to the inner core.

Referring now to the drawing, there is illustrated a transducer assembly, or hydrophone, including a hollow tubular element 10 of some suitable magnetostrictive material. In practice it has been found that a nickel tube about $\frac{1}{32}''$ thick and of $1\frac{3}{4}''$ outside diameter is especially satisfactory.

The length of the tube will, of course, be chosen to bear a definite relationship to the wavelength of the sound to be detected. For one purpose to which the described device may be put, such length was selected to be $5\frac{7}{8}''$.

The magnetostrictive tube 10 is intended to provide its own magnetic field, and hence is polarized before assembly by any desired method. The process should be carried out, however, so that the direction of polarization is lengthwise of the tube, since this provides optimum change of flux for any given energization of the transducer.

Soldered or otherwise securely attached to the respective ends of the member 10 are two caps 12. These end-caps, preferably composed of high-permeability material such as soft iron, may have grooves cut into their inner surface, as best shown in Fig. 3, which serve to position the magnetostrictive tube. Each end-cap is provided with a pair of apertures 14 through which fluid may enter the transducer when the latter is submerged.

To establish a closed path for the magnetic flux surrounding the magnetostrictive tube 10, a core 16 is positioned axially within the tube 10 and secured to each of the end-caps 12. This core 16 may take the form of a rod $6\frac{3}{4}''$ long, $\frac{1}{2}''$ in diameter, and composed of the same high-permeability material as that of which the end-caps 12 are formed. It is best held by a "sweat fit" within central apertures 18 in each end-cap, although other methods of joining these parts is within the scope of the disclosure.

Surrounding the core 16 for at least a part of its length is a pick-up coil 20. The structure of this coil is best shown in Fig. 3, the wire being wound on a form 21 of conventional design and then fitted over the core 16 before the end-caps 12 are soldered to the tube 10. Lead wires from the coil are brought out through the openings 14.

In order to protect the coil 20 from direct contact with the fluid which reaches the interior of the hydrophone through the openings 14, the coil may be coated with a watertight jacket 22, of some suitable non-magnetic material such as rubber. As an alternative, the coil may be molded in a plastic as a step in its manufacture.

It will be appreciated that any sound energy received by the hydrophone will cause the magnetostrictive tube to vibrate, and any such vibration which effects a change in its longitudinal dimension will cause a corresponding change in the magnetic flux in the core. This variation is converted into a current flow in the pick-up coil.

Various modifications of the structure described may be made within the scope of applicant's invention. For example, a flatter response curve may be obtained by placing suitable pressure release material on the inside of the magnetostrictive tube and end-caps. Also, if a response of higher amplitude is desired, the end-caps may be slightly separated from the magnetostrictive tube so that the latter may vibrate comparatively freely. In addition, while it is desirable to have the magnetostrictive tube provide its own polarization in the manner set forth, nevertheless it is possible to dispense with such a requirement and instead construct the end-caps of some suitable permanent magnet material.

Having thus described my invention, I claim:

1. A transducer comprising a magnetostrictive tube element, a first high permeability element engaged with one end of said tube element, a second high permeability element engaged with the other end of said tube element, one of said elements being permanently magnetically polarized, a high permeability core located axially within said tube element and engaged at each end to one of said high permeability elements, said tube element, said high permeability elements, and said core forming a magnetic circuit, the direction of magnetic polarization of said one of said elements being such as to cause magnetic flux to thread longitudinally through said tube element, and a pickup coil encircling at least a part of said core and sensitive to magnetic flux variations in said core resulting from any vibrational energy received by said tube which effects change in the longitudinal dimensional character of said tube, the outside diameter of said coil being considerably smaller than the inside diameter of said tube element whereby said coil does not inhibit vibration in said tube element.

2. A transducer as defined in claim 1 wherein the thickness of said tube element is approximately $1/32$ inch, the outside diameter of said tube element is approximately $1\frac{3}{4}$ inches and the diameter of said core is approximately $1/2$ inch.

3. A self-contained hydrophone unit particularly adapted for use in underwater signalling systems, said hydrophone unit comprising a magnetostrictive tube permanently magnetically polarized longitudinally; an end-cap of high permeability material secured to and extending beyond each end of said tube, each of said end-caps being formed with a bore coaxial with said tube, each of said end-caps being formed with at least one opening to permit passage of water into and out of said tube and to provide passages for lead in wires; a circular rod of high permeability material secured at its ends within the bores of said end-caps whereby there is provided a low-reluctance magnetic path through said circular rod, said end-caps and said tube; a pickup coil wound on a form of substantially the same length as said magnetostrictive tube and assembled coaxially with said rod and coextensive with said rod between said end-caps; and a watertight jacket of non-magnetic material for said pickup coil to protect said pickup coil from the deleterious effect of water flooding said hydrophone, the outside dimension of said watertight jacketed pickup coil being considerably smaller than the inside diameter of said tube so as not to inhibit vibration in said tube.

References Cited in the file of this patent

UNITED STATES PATENTS

| | | |
|---|---|---|
| 2,400,063 | Barton | May 14, 1946 |
| 2,407,243 | Batchelder | Sept. 10, 1946 |
| 2,468,837 | Peek | May 3, 1949 |
| 2,484,036 | Kauke | Oct. 11, 1949 |
| 2,521,136 | Thuras | Sept. 5, 1950 |